United States Patent
Howe et al.

(10) Patent No.: US 8,164,507 B2
(45) Date of Patent: Apr. 24, 2012

(54) FUSING MULTI-SENSOR DATA TO PROVIDE ESTIMATES OF STRUCTURES

(75) Inventors: Benjamin M. Howe, Plano, TX (US);
Daniel W. Otts, Allen, TX (US);
Winthrop W. Smith, Richardson, TX (US)

(73) Assignee: Raytheon Company, Waltham, MA (US)

( * ) Notice: Subject to any disclaimer, the term of this patent is extended or adjusted under 35 U.S.C. 154(b) by 283 days.

(21) Appl. No.: 12/427,474

(22) Filed: Apr. 21, 2009

(65) Prior Publication Data

US 2010/0268512 A1 Oct. 21, 2010

(51) Int. Cl.
*G01S 13/88* (2006.01)
*G01S 13/89* (2006.01)
*G06K 9/62* (2006.01)
*G06T 7/00* (2006.01)
*G01S 13/00* (2006.01)

(52) U.S. Cl. ............ 342/22; 382/100; 382/141; 342/52; 342/175; 342/176; 342/179; 342/190; 342/191; 342/195

(58) Field of Classification Search ............. 342/21, 342/22, 27, 28, 52–55, 59, 118, 128–133, 342/175, 192–197, 25 R–25 F, 176, 179, 342/190, 191; 703/1, 2; 702/127, 182–186, 702/189; 382/100, 141, 145, 149
See application file for complete search history.

(56) References Cited

U.S. PATENT DOCUMENTS

| | | | |
|---|---|---|---|
| 5,699,447 A * | 12/1997 | Alumot et al. | 382/145 |
| 5,982,921 A * | 11/1999 | Alumot et al. | 382/145 |
| 6,064,759 A | 5/2000 | Buckley et al. | |
| 6,178,257 B1 * | 1/2001 | Alumot et al. | 382/145 |
| 6,330,523 B1 | 12/2001 | Kacyra et al. | |
| 6,501,414 B2 * | 12/2002 | Arndt et al. | 342/22 |
| 6,952,491 B2 * | 10/2005 | Alumot et al. | 382/149 |
| 7,053,820 B2 * | 5/2006 | Goodman et al. | 342/179 |
| 7,062,417 B2 * | 6/2006 | Kruger et al. | 703/2 |
| 7,151,976 B2 * | 12/2006 | Lin | 702/182 |
| 7,307,575 B2 | 12/2007 | Zemany | |
| 7,499,583 B2 * | 3/2009 | Alumot et al. | 382/149 |
| 7,526,405 B2 * | 4/2009 | Miller | 382/145 |
| 7,796,807 B2 * | 9/2010 | Alumot et al. | 382/149 |

(Continued)

FOREIGN PATENT DOCUMENTS

EP 1 777 550 A1 4/2007

OTHER PUBLICATIONS

Inventor Daniel W. Otts, "Designating Corridors to Provide Estimates of Structures," U.S. Appl. No. 12/683,924, 21 pages plus 3 pages of drawings, filing date Jan. 7, 2010.

(Continued)

*Primary Examiner* — Bernarr Gregory
(74) *Attorney, Agent, or Firm* — Pierce Atwood LLP; Joseph M. Maraia

(57) ABSTRACT

In particular embodiments, analyzing data includes receiving sensor data generated in response to sensing one or more structures. The structural features of the sensor data are identified. Each structural feature is represented by one or more vectors. A score matrix that describes a plurality of distances among the vectors is generated. Vector pairs are formed from at least some of the vectors according to the distances of the score matrix. A layout of the structures is generated from the vector pairs.

24 Claims, 8 Drawing Sheets

U.S. PATENT DOCUMENTS

| | | |
|---|---|---|
| 2007/0241738 A1 | 10/2007 | Baranauskas et al. |
| 2009/0033539 A1 | 2/2009 | Zemany |
| 2009/0243916 A1 | 10/2009 | Beeri et al. |
| 2009/0289830 A1 | 11/2009 | Pergande et al. |
| 2009/0295618 A1 | 12/2009 | Beeri et al. |

OTHER PUBLICATIONS

Patent Application entitled *"Fusing Structures From Multi-Sensor Data,"* 26 pages specification, claims, and abstract, 4 pages of drawings, inventor Daniel W. Otts, Jan. 13, 2010.

Patent Application entitled *"Fusing Multi-Sensor Data Sets According to Relative Geometrical Relationship,"* 31 pages specification, claims, and abstract, 5 pages of drawings, inventor Daniel W. Otts, Jan. 13, 2010.

Leavers, V. F., ed., *"Shape Detection in Computer Vision Using the Hough Transform"*, Towards a Representation of Shape, XP007914240, ISBN: 978-3-54019723-2, pp. 88-107, Jan. 1, 1992.

Tat Soon Yeo, et al., *"A New Subaperture Approach to High Squint SAR Processing"*, IEEE Transactions on Geoscience and Remote Sensing, vol. 39, No. 5, XP011021759A, ISSN: 0196-2892, pp. 954-968, May 1, 2001.

Bin Luo, et al., *"Graph Spectral Approach for Learning View Structure"*, 16th International Conference on Pattern Recognition (ICPR '02), vol. 3, XP010613741A, ISBN: 978-0-7695-1695-0, pp. 785-788, Aug. 11, 2002.

Ma Yi et al., *"An invitation to 3-D Vision, Representation of a Three-Dimensional Moving Scene, Quaternions and Euler Angles for Rotations"*, Springer Verlag, Berlin, XP007914241, ISBN: 978-0-387-00893-6, pp. 390-403, Jan. 1, 2004.

Zhiguang Zhong, et al., *"Pose Estimation and Structure Recovery from Point Pairs"*, Proceedings of the 2005 IEEE International Conference on Robotics and Automation, Barcelona, Spain, XP010872265A, ISBN: 978-0-7803-8914-4, pp. 442-447, Apr. 18, 2005.

Zhiguang, Zhong, et al., *"Effective pose estimation from point pairs"*, Image and Vision Computing, Elsevier, vol. 23, No. 7, XP004921786, ISSN: 0262-8856, pp. 651-660, Jul. 1, 2005.

Roberto Nerino, *"Automatic registration of point-based surfaces"*, WSEAS Transactions on Computers, Issue 12, vol. 5, ISSN: 1109-2750, XP8125025A, pp. 2984-2991, Dec. 1, 2006.

Dr. Christophe Gouinaud, *"SAR Image Fusion in Multi Sensor Context for Small Urban Area Detection"*, IGARSS, IEEE, XP031422669, ISBN: 978-'-4244-2807-6, pp. III-988 thru III-991, Jul. 7, 2008.

PCT, Notification of Transmittal of the International Search Report and the Written Opinion of the International Searching Authority, or the Declaration, International Application No. PCT/US2010/031824, 16 pages, Aug. 12, 2010.

Kruskal, J.B., *"Multidimensional Scaling by Optimizing Goodness of Fit to a Nonmetric Hypothesis"*, Psychometrika, vol. 29, No. 1, XP008130844, 27 pages, Mar. 1, 1964.

Lee, Sang-Chul, et al., *"Multisensor Raster and Vector Data Fusion Based on Uncertainty Modeling"*, 2004 International Conference on Image Processing (ICIP), IEEE, pp. 3355-3358, Oct. 2004.

PCT, Notification of Transmittal of the International Search Report and the Written Opinion of the International Searching Authority, or the Declaration, International Application No. PCT/US2010/053095, 14 pages, Mar. 9, 2011.

Wenxia, Shi, et al. "Investigating the Performance of Corridor and Door Detection Algorithms in Different Environments", Information and Automation, 2006, ICIA 2006. International Conference on, IEEE, Dec. 1, 2006 pp. 206-211.

Holland, John, "Designing Autonomous Mobile Robots: Inside the Mind of an Intelligent Machine", Dec. 29, 2003, Newness, pp. 1-352.

Newman, P., et al., "Outdoor SLAM using visual appearance and laser ranging" Robotics and Automation, 2006, ICRA 2006 Proceedings 2006 IEEE International Conference at Orlando, FL. May 15-19, 2006 IEEE, May 15, 2006, pp. 1180-1187.

Siagian, C., et al., "Biologically Inspired Mobile Robot Vision Localization", IEEE Service Center, vol. 25, No. 4, Aug. 1, 2009, pp. 861-873.

Stilla, U. et al., "Potential and limits of InSAR data for building reconstruction in built-up areas" ISPRS Journal of Photogrammetry and Remote Sensing, vol. 58, No. 1-2, Jun. 1, 2003, pp. 113-123.

Nerino, R., "Automatic registration of point-based surfaces", WSEAS Transactions on Computers World Scientific and Engineering Academy and Society, vol. 5, No. 12, Dec. 1, 2006 pp. 2984-2991.

Notification of Transmittal of the International Search Report and the Written Opinion of the International Search Authority, or the Declaration, PCT/US2011/020064 dated Mar. 16, 2011, 13 pages.

Jean-Philippe Thirion, *"New Feature Points based on Geometric Invariants for 3D Image Registration"*, International Journal of Computer Vision, vol. 18, No. 2, pp. 121-137, May 1, 1996.

Roberto Nerino, *"Invariant features for automatic coarse registration of point-based surfaces"*, Proc. of the 6th WSEAS Int. Conf. on Signal Processing, Computational Geometry & Artificial Vision, Elounda, Greece, XP-002634722, pp. 10-15, Aug. 21-23, 2006.

Marinella Cadoni, et al., *"3D Face Recognition Using Joint Differential Invariants"*, Advances in Biometrics, Springer Berlin Heidelberg, Berlin, Heidelberg, XP019117937, pp. 279-288, Jun. 2, 2009.

PCT Notification of Transmittal of the International Search Report and the Written Opinion of the International Searching Authority, or the Declaration, International Application No. PCT/US2011/020726, 13 pages, May 10, 2011.

\* cited by examiner

FUSING MULTI-SENSOR DATA TO PROVIDE ESTIMATES OF STRUCTURES

TECHNICAL FIELD

This invention relates generally to the field of sensor data analysis and more specifically to fusing multi-sensor data to provide estimates of structures.

BACKGROUND

Enforcement, security, and military forces may perform operations in structures such as buildings. These forces may need to know the layout, for example, the floor plan, of the structures. In certain situations, however, the layout may not be available.

SUMMARY OF THE DISCLOSURE

In accordance with the present invention, disadvantages and problems associated with previous techniques for fusing multi-sensor data may be reduced or eliminated.

In particular embodiments, analyzing data includes receiving sensor data generated in response to sensing one or more structures. The structural features of the sensor data are identified. Each structural feature is represented by one or more vectors. A score matrix that describes a plurality of distances among the vectors is generated. Vector pairs are formed from at least some of the vectors according to the distances of the score matrix. A layout of the structures is generated from the vector pairs.

Certain embodiments of the invention may provide one or more technical advantages. A technical advantage of one embodiment may be that structural features indicated by sensor data are represented by vectors. The vectors are then placed in a score matrix in order to determine structures sensed by the sensors. Another technical advantage of one embodiment may be that vector pairs representing a connection between two structural features are formed using the score matrix. The vector pairs aid in the identification of structures sensed by the sensors.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 8E of the drawings, like numerals being used for like and corresponding parts of the various drawings.

Figure 1:
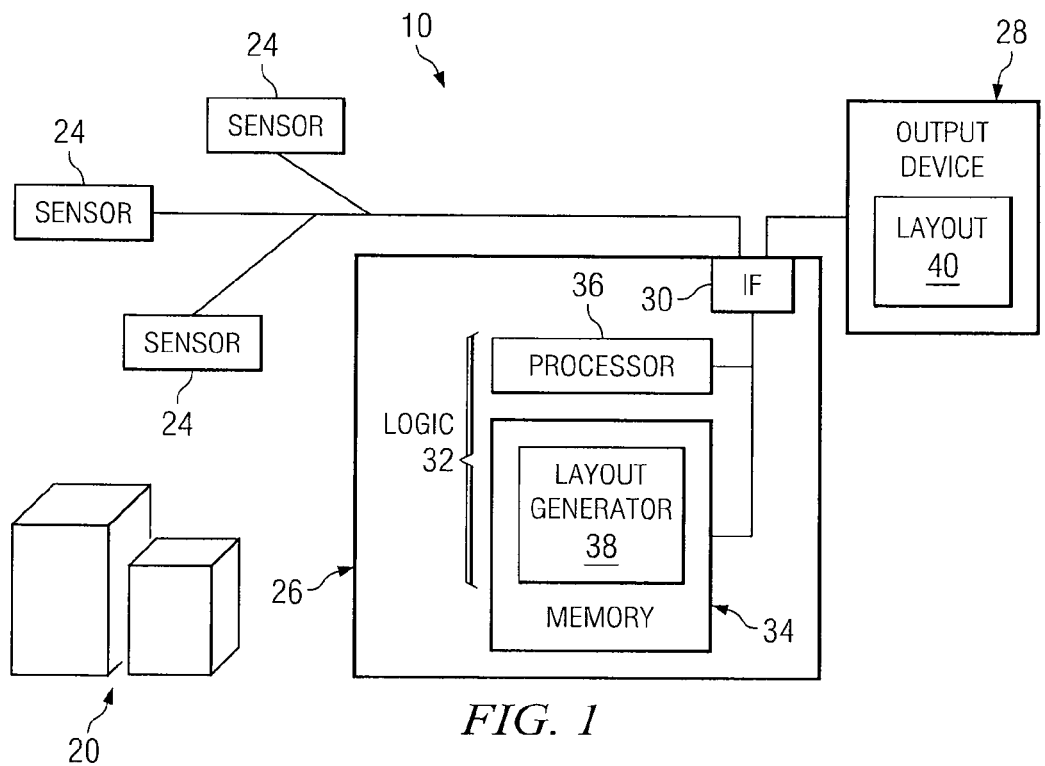
FIG. 1 illustrates one embodiment of a system configured to fuse multi-sensor data to provide estimates of structures.

FIG. 1 illustrates one embodiment of a system 10 configured to fuse multi-sensor data to provide estimates of structures 20. In the illustrated embodiment, system 10 includes sensors 24, a computing system 26, and an output device 28. Computing system 26 includes an interface (IF) 30, logic 32, and memory 34. Logic 32 includes a processor 36 and applications such as a layout generator 38. Output device 28 displays a layout 40.

In certain embodiments, system 10 receives sensor data from sensors 24 sensing structures 20 and generates layout 40 of structures 20. In the embodiments, system 10 represents structural features indicated by sensor data by vectors, and places the vectors in a score matrix. System 10 then forms vector pairs representing a connection between two structural features using the score matrix. The vector pairs are used to determine structures 20 sensed by the sensors.

In the illustrated embodiment, structures 20 may be one or more natural and/or manmade physical objects. Examples of structures 20 include buildings such as military, corporate, residential, academic, or medical buildings. In certain embodiments, a structure 20 may have internal features that are not visible outside of structure 20. For example, a building may have rooms bordered by walls such that the rooms are not visible outside of the building. The layout of the structure, such as the floor plan of a building, may describe at least some of these internal features.

Structures 20 may have structural features that are physical features of the geometry of the structure. For example, the structural features of the building may include walls of a room and corners of a room where two walls meet. Structural features may be used to generate a layout 40 of the structures 20. The layout of a room may be provided in two dimensions (2D) or three dimensions (3D). A wall, or "plate," may be represented a line in a two-dimensional layout or a plane in a three-dimensional layout. A corner may be represented by a type of n-hedral, which is a set of n lines with a common point, where n is an integer. The common point may be called the "corner point." A corner may be represented by a dihedral, or 2-hedral, in a two-dimensional layout or a trihedral, or 3-hedral, in a three-dimensional layout.

Sensors 24 may generate sensor data in response to sensing one or more structures 20. The sensor data may describe the structural features of the structures. Sensor 24 may be any suitable sensing device. Examples of sensor 24 include radar sensors, video cameras, camcorders, closed-circuit television cameras, digital cameras, surveillance cameras, infrared cameras, x-ray cameras, and/or satellite cameras. In certain embodiments, more than one sensor 24 may send data to computing system 26.

Computing system 26 receives sensor data from one or more sensors 24 and fuses the sensor data to generate a layout 40 of structures 20. Interface 30 receives input, sends output, processes the input and/or output, and/or performs other suitable operation. Interface 30 may comprise hardware and/or software.

Logic 32 performs the operations of the component, for example, executes instructions to generate output from input. In certain embodiments, layout generator 38 generates a layout 40 of structures 20. In the embodiments, layout generator 38 receives sensor data and identifies structural features of the sensor data. Layout generator 38 represents the structural features by vectors, and generates a score matrix that describes the distances among the vectors. Layout generator 38 forms vector pairs from the vectors according to the distances of the score matrix, where a vector pair represents structural features. Layout generator 38 then estimates structures from the vector pairs. A method that layout generator 38 may use to generate layout 40 is described in more detail with respect to FIG. 2.

Logic 32 may include hardware, software, and/or other logic. Logic 32 may be encoded in one or more tangible media and may perform operations when executed by a computer. Certain logic 32, such as processor 36, may manage the operation of a component. Examples of a processor 36 include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 34 stores information an applications such as layout generator 38. Memory 34 may comprise one or more tangible, computer-readable, and/or computer-executable storage medium. Examples of memory 34 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server) and/or other computer-readable medium.

Output device 28 outputs layout 40 generated by computing system 26. Output device may provide layout 40 in any suitable manner, for example, as a visual display, a printed hard copy, or an audio file. Examples of output device 28 includes a computer display, a printer, or a speaker.

Modifications, additions, or omissions may be made to system 10 without departing from the scope of the invention. The components of system 10 may be integrated or separated. Moreover, the operations of system 10 may be performed by more, fewer, or other components. For example, the operations of sensors 29 and computing system 26 may be performed by one component, or the operations of layout generator 38 may be performed by more than one component. As used in this document, "each" refers to each member of a set or each member of a subset of a set.

Figure 2:
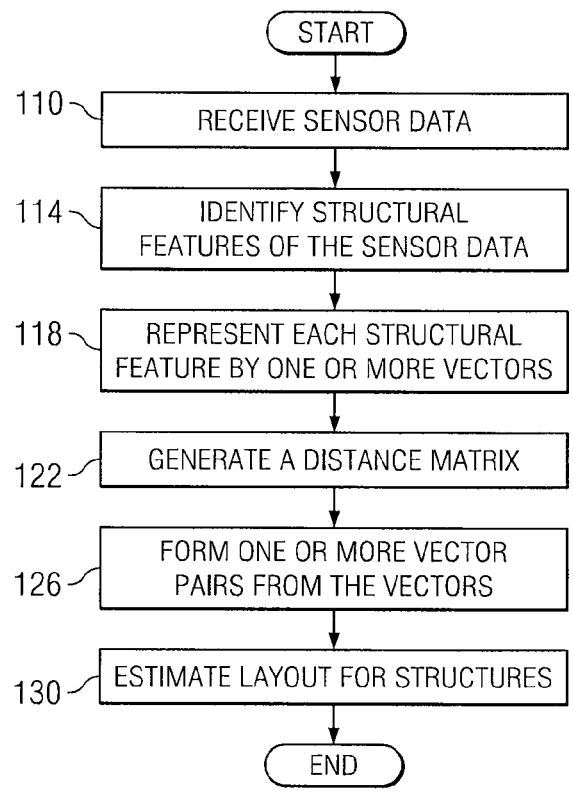
FIG. 2 illustrates an example of a method for fusing multi-sensor data to provide estimates of structures.

FIG. 2 illustrates an example of a method for fusing multi-sensor data to provide estimates of structures. The method may be performed by system 10 of FIG. 1.

In certain embodiments, sensor data is received at step 110. The sensor data may be generated in response to sensing structures 20 and may describe structural features of structures 20. The structural features of the sensor data are identified at step 114. The structural features of the sensor data may be identified in any suitable manner.

Figure 3:
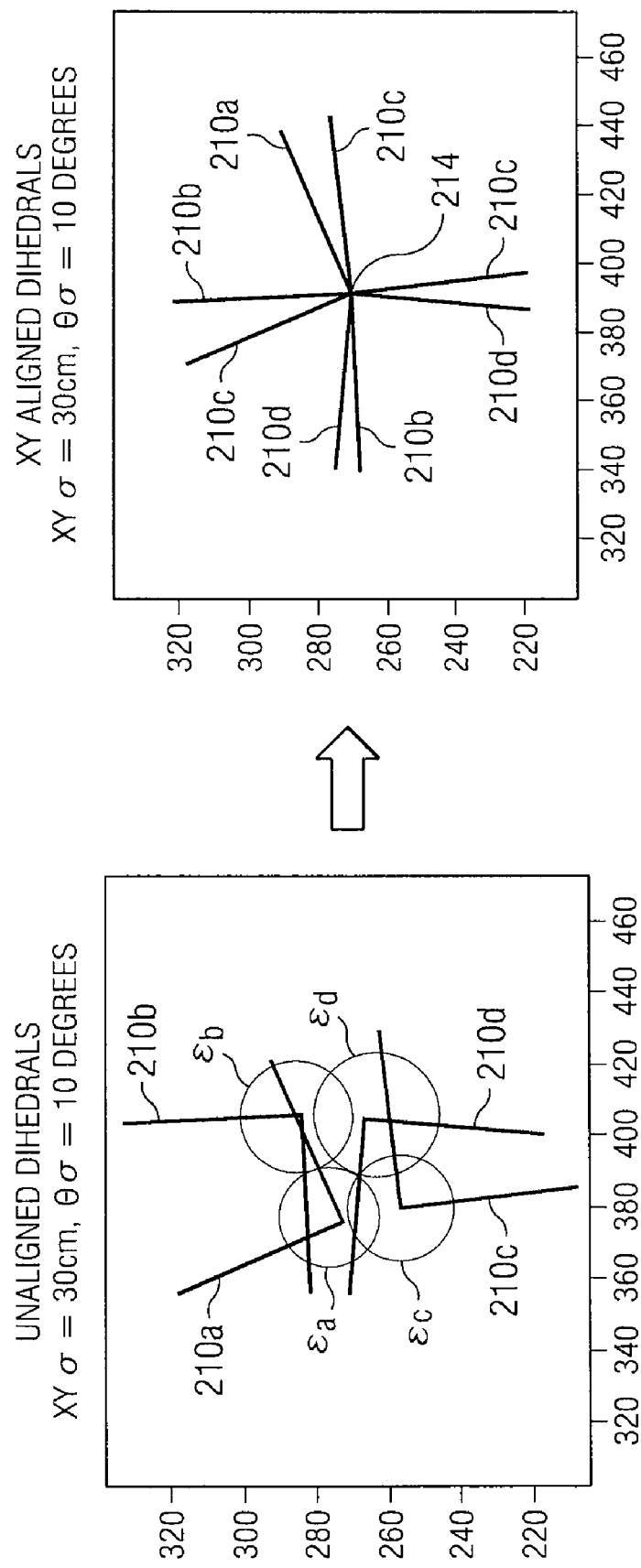
FIG. 3 illustrates an example of identifying structural features.

FIG. 3 illustrates an example of identifying structural features of sensor data. In certain embodiments, candidate structural features are identified. Candidate structural features may be structural features that are likely to represent the same physical structural feature. Candidate structural features may be proximate to each other or may have portions that are proximate to each other.

In the illustrated example, the candidate structural features include dihedrals 210a-210d selected according to distance between the corner points of dihedrals 210a-210d. In the example, dihedrals 210a-210d have corner points that are within a specific distance of each other. The distance may be determined by the error associated with the sensor data. In the illustrated example, each dihedral 210a-210d has associated errors $\epsilon_a$-$\epsilon_d$, respectively, at the corner points. If the errors of the structural features overlap, the structural features may be selected as candidate structural features.

Candidate structural features are clustered to yield one representation of a structural feature. Candidate structural features may be clustered in any suitable manner. In particular embodiments, the corner points of dihedrals 210a-210d are overlapped to form a common point 214. The location of common point 214 may be calculated from the average of the locations of the corner points of dihedrals 210a-210d, where the average may be weighted based on errors $\epsilon_a$-$\epsilon_d$. In other particular embodiments, the candidate structural feature with the smallest error is selected. Candidate structural features within the statistical distance threshold of the selected feature are fused.

Referring back to FIG. 1, each structural feature is represented by one or more vectors at step 118 to yield a plurality of vectors. A structural feature may be represented by vectors in any suitable manner.

Figure 4A:
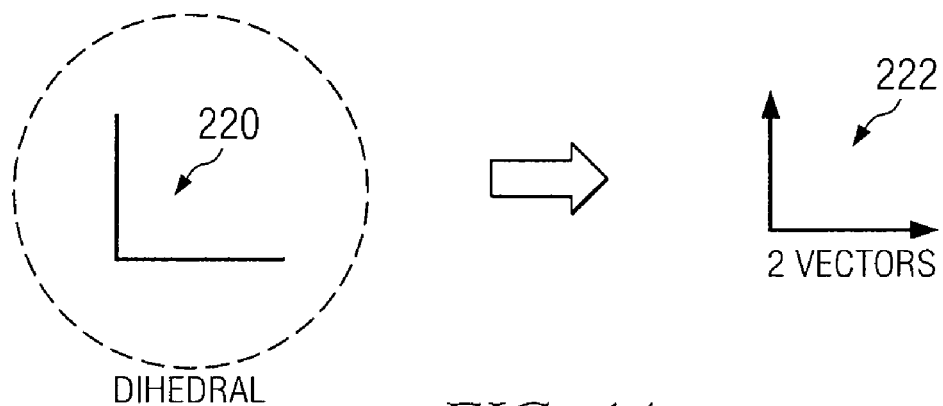
FIGS. 4A-4C illustrate representing n-hedrals by vectors.
Figure 4B:
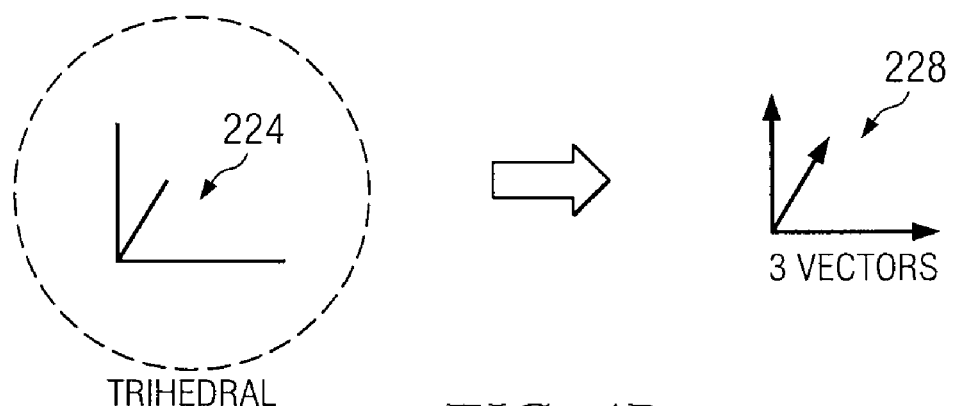

FIGS. 4A-5C illustrate examples of representing structural features by vectors. FIGS. 4A and 4B illustrate an example of representing an n-hedral using a set of n-vectors, where n represent the number of sides of the n-hedral. In FIG. 4A, a dihedral is represented by two vectors, and in FIG. 4B, a tri-hedral is represented by three vectors.

Figure 4C:
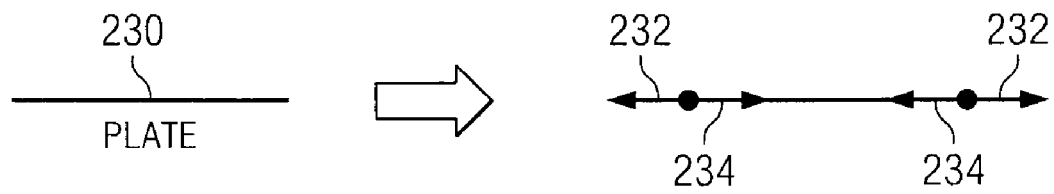

FIG. 4C illustrates an example of representing a plate (or wall) by a set of vectors. In certain embodiments, a plate is represented by a set of vectors comprising at least one wall opening vector 232 and at least one wall closing vector 234. A wall opening vector 232 points in the direction of the space beside a wall. A wall closing vector 234 points towards the wall itself.

Figure 5A:
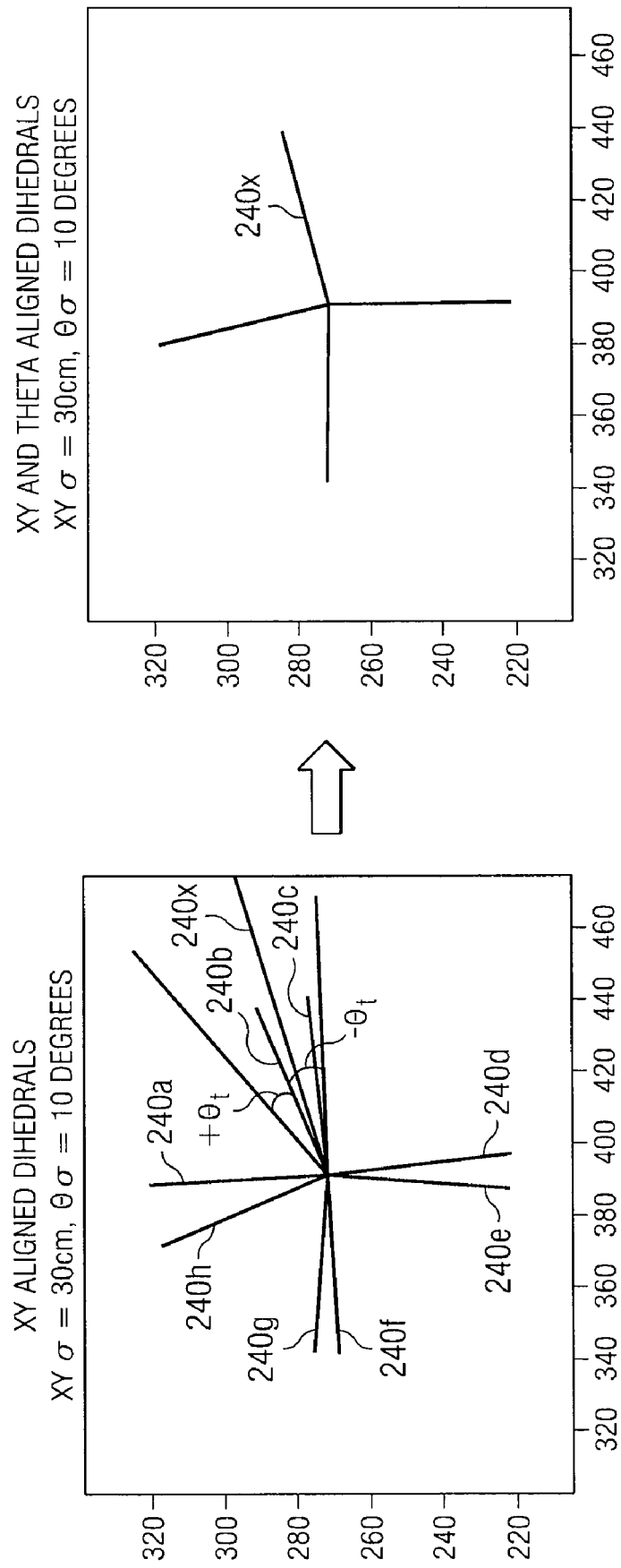
FIG. 5A illustrates an example of fusing vectors of a structural feature.

FIG. 5A illustrates an example of removing duplicate vectors that represent the same hedral edge. Duplicate vectors may be removed in any suitable manner. In certain embodiments, angular distances between vectors 240a-240h of a structural feature are calculated. Vectors 240a-240h with an angular distance that satisfies an angular distance threshold are fused together. For example, vectors that are less than an angular distance threshold are fused together. The angular distance threshold may be any suitable value. For example, the angular distance threshold for a vector 240 may be the rotational uncertainty of vector 240. As another example, the angular distance threshold may be a set value in the range of 0 to 45 degrees.

Any suitable procedure may be used to search for duplicate vectors 240. In certain embodiments, each vector may be searched within the angular distance threshold in a positive direction and a negative direction. In the illustrated example, a search is made in the plus threshold direction and the negative threshold direction of vector 240b. The vectors 240c found within the angular distance threshold may be used to generate a new vector 240x that replaces the duplicate vectors 240a and 240c. The rotation of the new vector 240x may be set to the average of the identified vectors. The average may be weighted by the rotational errors of the vectors 240b and 240c.

In other embodiments, a vector 240b with the smallest angular uncertainty may be selected. Vectors 240c within the angular statistical distance threshold of the selected vector 240b may be fused with the selected vector 240b.

Figure 5B:
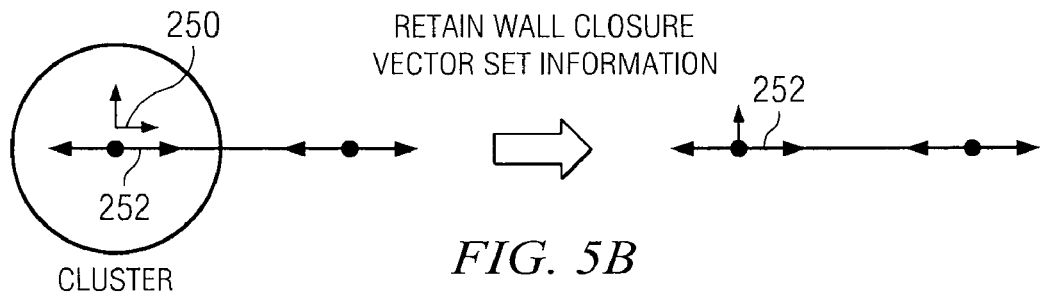
FIGS. 5B-5C illustrate an example of retaining or removing vectors for a structural feature.
Figure 5C:
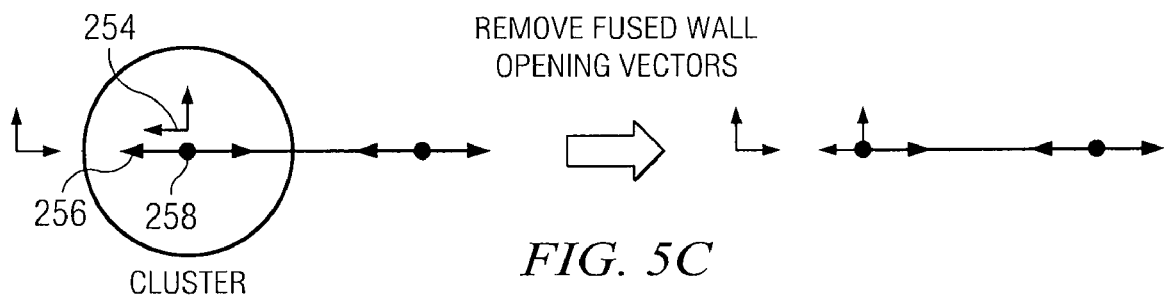

FIGS. 5B and 5C illustrate an example of retaining or removing wall vectors. In certain embodiments, a wall opening vector of a first structural feature may or may not agree with a second structural feature. If they agree, the wall opening vector may be maintained. If not, the wall opening vector may be removed.

FIG. 5B illustrates a dihedral 250 and a wall closing vector 252 that both indicate that a wall is in the same direction. Accordingly, wall closing vector 252 is maintained.

FIG. 5C illustrates an example of where a dihedral 254 and a wall opening vector 256 disagree. Dihedral 254 indicates that there is a wall to the left of point 258, and wall opening vector 256 indicates that there is an opening to the left of point 258. Accordingly, wall opening vector 256 is removed.

Referring back to FIG. 1, a score matrix that describes a plurality of distances among the vectors is generated at step 122. The score matrix may be an M×M matrix, where M represents the number of vectors $v_i$, i=[1,M].

$$\begin{array}{c} & v_O & v_k & v_M \\ v_o & \begin{bmatrix} -1 & \ldots & \ldots & \ldots & S_{0M} \\ \vdots & \ddots & S_{jk} & & \vdots \\ \vdots & & \ddots & & \vdots \\ \vdots & & & \ddots & \vdots \\ S_{M0} & \ldots & \ldots & \ldots & -1 \end{bmatrix} \\ v_j & \\ v_M & \end{array}$$

The distance $S_{jk}$ between vectors $v_j$ and $v_k$ may be given by any suitable function.

Figure 6:
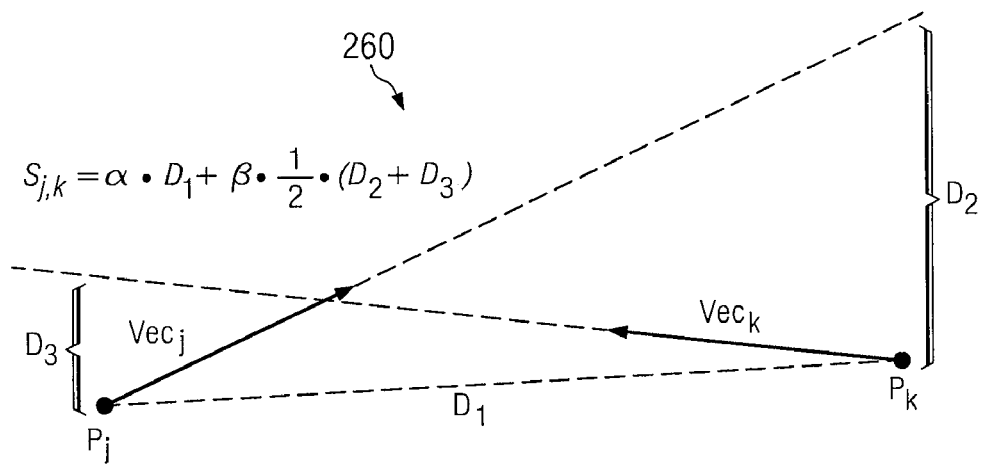
FIG. 6 illustrates an example of a distance function.

FIG. 6 illustrates an example of a distance formula. In certain embodiments, the distance may be given by:

$$S_{j,k} = \alpha \cdot D_1 + \beta \cdot \frac{1}{2} \cdot (D_2 + D_3)$$

where $D_1$, $D_2$, and $D_3$ are shown in FIG. 6, and α are β scaling factors. Scaling factor a scales the distance between the origins of the vectors, and scaling factor β scales the directions of the vectors.

Referring back to FIG. 1, the diagonal entries representing the distance between the same vector is zero, and is set to a non-valid value, for example, −1. In certain embodiments, the product of the vectors must be less than zero. That is, the vectors point towards each other.

One or more vector pairs are formed from the vectors according to the distances of the score matrix at step 126. A vector pair represents one or more structural features, and vector pairs may be formed in any suitable manner. For example, wall closing vectors may be connected to indicate the presence of a wall. The wall closing vectors may then be removed from further consideration.

Figure 7A:
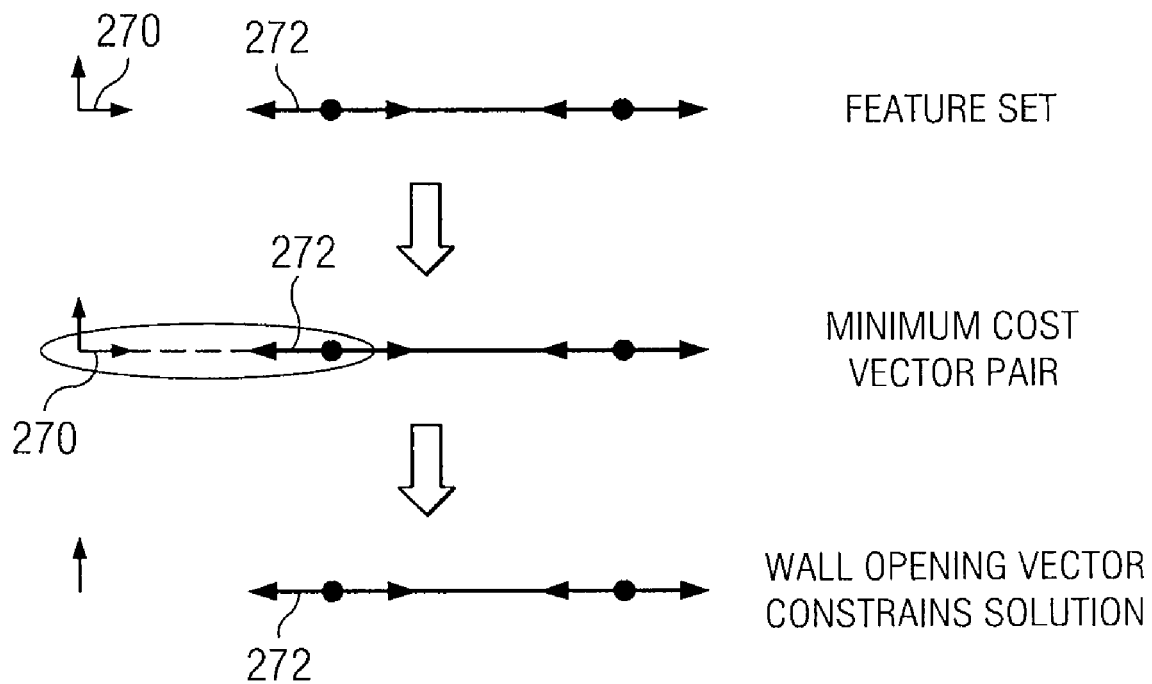
FIG. 7A illustrates an example of forming a vector pair.
Figure 7B:
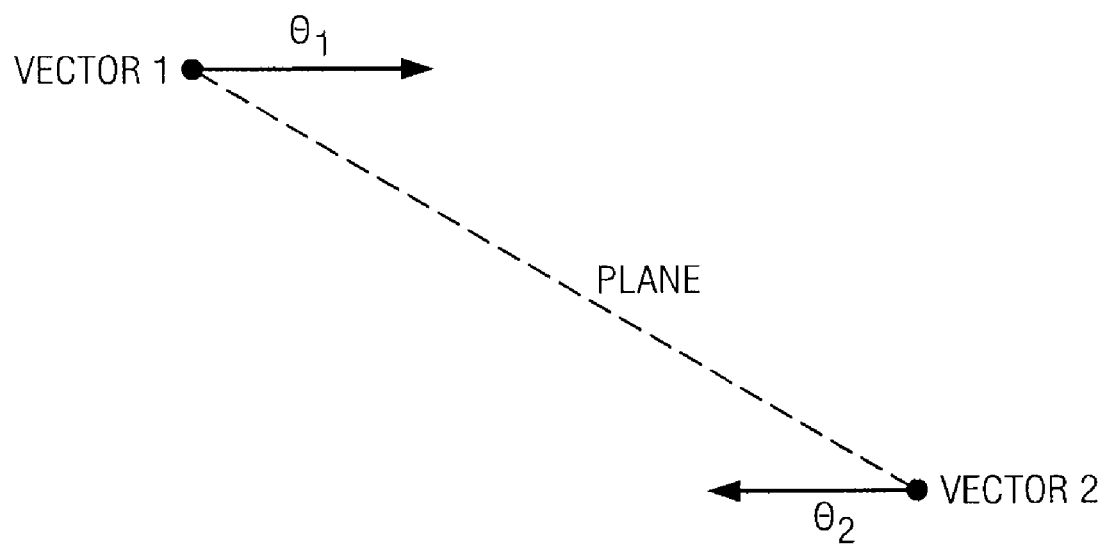
FIG. 7B illustrates an example of testing the alignment of a plane with vectors.

FIGS. 7A and 7B illustrate examples of forming vector pairs. FIG. 7A illustrates an example of maintaining a wall opening vector to constrain a solution. In the illustrated example, a structural feature 270 and a wall opening vector 272 may conflict about whether there is a wall or an opening. Structural feature 270 indicates that there is a wall where wall opening vector 272 indicates there is an opening. Vector 270 is removed in order to allow wall opening vector 272 to constrain the solution.

FIG. 7B illustrates an example of a test that may be used to determine whether to form a vector pair from two vectors. In certain embodiments, two vectors that have a minimum distance between them may be selected as candidates for a vector pair. A plane that includes the origins of the vectors may be tested to determine whether or not the plane intersects an existing plane. If the plane intersects an existing plane, the two vectors are not designated as a vector pair.

If the plane does not intersect an existing plane, the plane may be tested to determine whether the plane is substantially aligned with the two vectors. If the plane is not substantially aligned, the two vectors are not designated as a vector pair. In the example, if an angle $\theta_1$ or $\theta_2$ is greater than a threshold angle, then the plane is not substantially aligned. The threshold angle may have any suitable value, such as a value in the range of 0 to 45 degrees. If the plane is substantially aligned, the two vectors are designated as a vector pair.

The two vectors may be marked as not paired, which removes the vector pair from further consideration. The two vectors, however, may be kept for further consideration to be paired with other vectors.

Referring back to FIG. 1, one or more structures 20 are estimated from the vector pairs at step 130. In certain embodiments, the layout of structures 20 is determined. The vector pairs indicate structural features, such as walls and corners, of structures 20. The corners and walls may be used to generate a layout by, for example, connecting the walls and corners. The method then terminates.

FIGS. 8A-8E illustrate an example of estimating the layout of structures using a score matrix. In certain embodiments, at each iteration, the smallest (or lowest) valid score in the matrix is identified. The vectors with the smallest score are joined with a candidate edge. If the candidate edge does not intersect any existing edges, the candidate edge is confirmed as an edge and the vectors are marked as already matched. The vectors may be marked as already matched by setting the scores of the vectors to a non-valid value. If a candidate edge intersects an existing edges, the candidate edge is marked with a non-valid value.

Figure 8A:
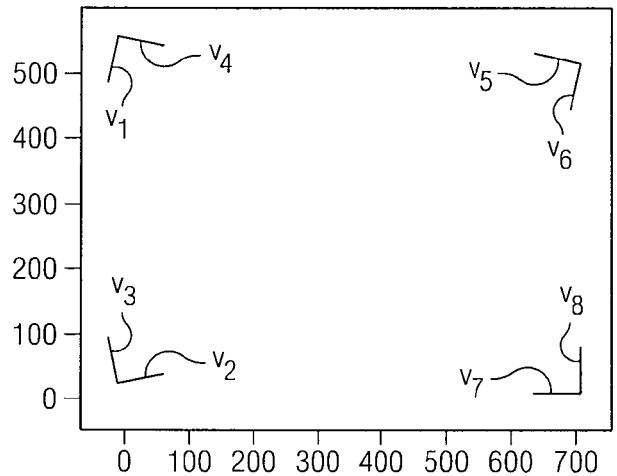
FIGS. 8A-8E illustrate an example of estimating the layout of structures.

FIG. 8A illustrates vectors $v_1$ through $v_8$. An example of a score matrix that includes the distances between vectors $v_1$ through $v_8$ is provided:

|       | $v_1$ | $v_2$ | $v_3$ | $v_4$ | $v_5$ | $v_6$ | $v_7$ | $v_8$ |
|-------|------|------|------|------|------|------|------|------|
| $v_1$ | −1   | −1   | 1090 | 2154 | 4407 | 4311 | −1   | −1   |
| $v_2$ | −1   | −1   | 2130 | 3194 | 3287 | 3192 | 1123 | 2890 |
| $v_3$ | 1090 | 2130 | −1   | −1   | −1   | −1   | 4309 | 4697 |
| $v_4$ | 2154 | 3194 | −1   | −1   | 1185 | 2682 | 3258 | 3646 |
| $v_5$ | 4407 | 3287 | −1   | 1185 | −1   | −1   | −1   | −1   |
| $v_6$ | 4311 | 3192 | −1   | 2682 | −1   | −1   | 2038 | 810  |
| $v_7$ | −1   | 1123 | 4309 | 3258 | −1   | 2038 | −1   | −1   |
| $v_8$ | −1   | 2790 | 4697 | 3646 | −1   | 810  | −1   | −1   |

In the example matrix, −1 represents a non-valid value.

Figure 8B:
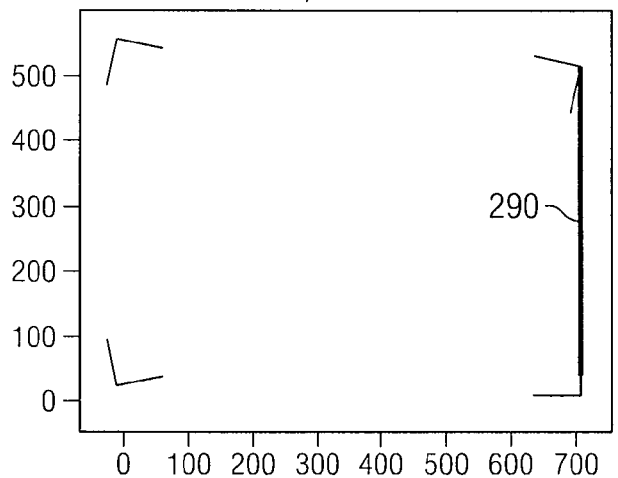

FIG. 8B illustrates candidate edge 290. In the illustrated example, vectors $v_6$ and $v_8$ have the smallest score of 810. Candidate edge 290 does not intersect any existing edges, so candidate edge 290 is confirmed as an edge. Vectors $v_6$ and $v_8$ are designated as a vector pair and removed from further consideration:

|       | $v_1$ | $v_2$ | $v_3$ | $v_4$ | $v_5$ | $v_6$ | $v_7$ | $v_8$ |
|-------|-------|-------|-------|-------|-------|-------|-------|-------|
| $v_1$ | −1    | −1    | 1090  | 2154  | 4407  | −1    | −1    | −1    |
| $v_2$ | −1    | −1    | 2130  | 3194  | 3287  | −1    | 1123  | −1    |
| $v_3$ | 1090  | 2130  | −1    | −1    | −1    | −1    | 4309  | −1    |
| $v_4$ | 2154  | 3194  | −1    | −1    | 1185  | −1    | 3258  | −1    |
| $v_5$ | 4407  | 3287  | −1    | 1185  | −1    | −1    | −1    | −1    |
| $v_6$ | −1    | −1    | −1    | −1    | −1    | −1    | −1    | −1    |
| $v_7$ | −1    | 1123  | 4309  | 3258  | −1    | −1    | −1    | −1    |
| $v_8$ | −1    | −1    | −1    | −1    | −1    | −1    | −1    | −1    |

Figure 8C:
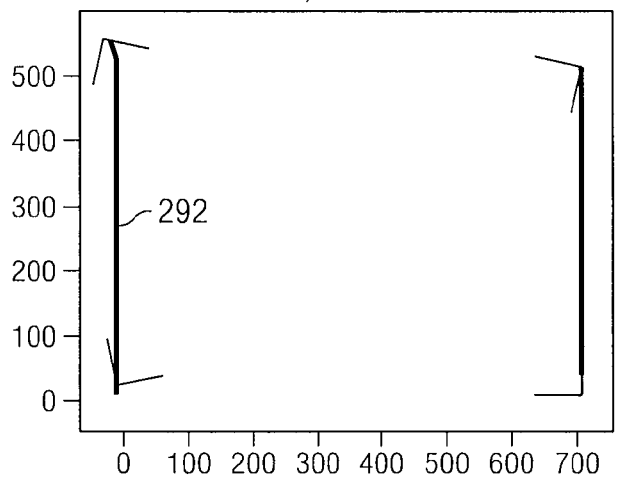

FIG. 8C illustrates candidate edge 292. Vectors $v_1$ and $v_3$ have the smallest valid score of 1090. Candidate vector 292 does not intersect any existing edges, so candidate edge 292 is confirmed as an edge. Vectors $v_1$ and $v_3$ are designated as a vector pair and removed from further consideration:

|       | $v_1$ | $v_2$ | $v_3$ | $v_4$ | $v_5$ | $v_6$ | $v_7$ | $v_8$ |
|-------|-------|-------|-------|-------|-------|-------|-------|-------|
| $v_1$ | −1    | −1    | −1    | −1    | −1    | −1    | −1    | −1    |
| $v_2$ | −1    | −1    | −1    | 3194  | 3287  | −1    | 1123  | −1    |
| $v_3$ | −1    | −1    | −1    | −1    | −1    | −1    | −1    | −1    |
| $v_4$ | −1    | 3194  | −1    | −1    | 1185  | −1    | 3258  | −1    |
| $v_5$ | −1    | 3287  | −1    | 1185  | −1    | −1    | −1    | −1    |
| $v_6$ | −1    | −1    | −1    | −1    | −1    | −1    | −1    | −1    |
| $v_7$ | −1    | 1123  | −1    | 3258  | −1    | −1    | −1    | −1    |
| $v_8$ | −1    | −1    | −1    | −1    | −1    | −1    | −1    | −1    |

Figure 8D:
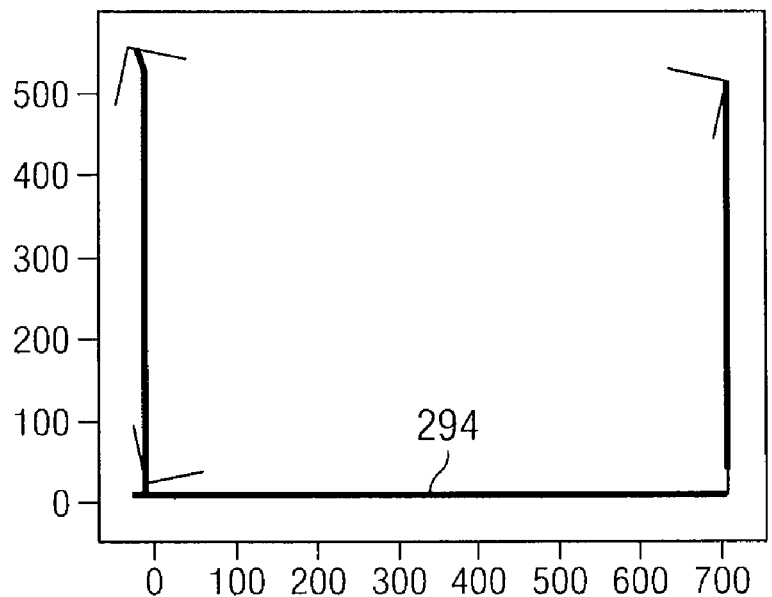

FIG. 8D illustrates candidate edge 294. Vectors $v_2$ and $v_7$ have the smallest score. A candidate edge 294 is used to connect the vectors. Candidate edge 294 does not intersect an existing edge, so edge 294 is confirmed as an edge. Vectors $v_2$ and $v_7$ are designated as a vector pair and removed from consideration.

|       | $v_1$ | $v_2$ | $v_3$ | $v_4$ | $v_5$ | $v_6$ | $v_7$ | $v_8$ |
|-------|-------|-------|-------|-------|-------|-------|-------|-------|
| $v_1$ | −1    | −1    | −1    | −1    | −1    | −1    | −1    | −1    |
| $v_2$ | −1    | −1    | −1    | −1    | −1    | −1    | −1    | −1    |
| $v_3$ | −1    | −1    | −1    | −1    | −1    | −1    | −1    | −1    |
| $v_4$ | −1    | −1    | −1    | −1    | 1185  | −1    | −1    | −1    |
| $v_5$ | −1    | −1    | −1    | 1185  | −1    | −1    | −1    | −1    |
| $v_6$ | −1    | −1    | −1    | −1    | −1    | −1    | −1    | −1    |
| $v_7$ | −1    | −1    | −1    | −1    | −1    | −1    | −1    | −1    |
| $v_8$ | −1    | −1    | −1    | −1    | −1    | −1    | −1    | −1    |

Figure 8E:
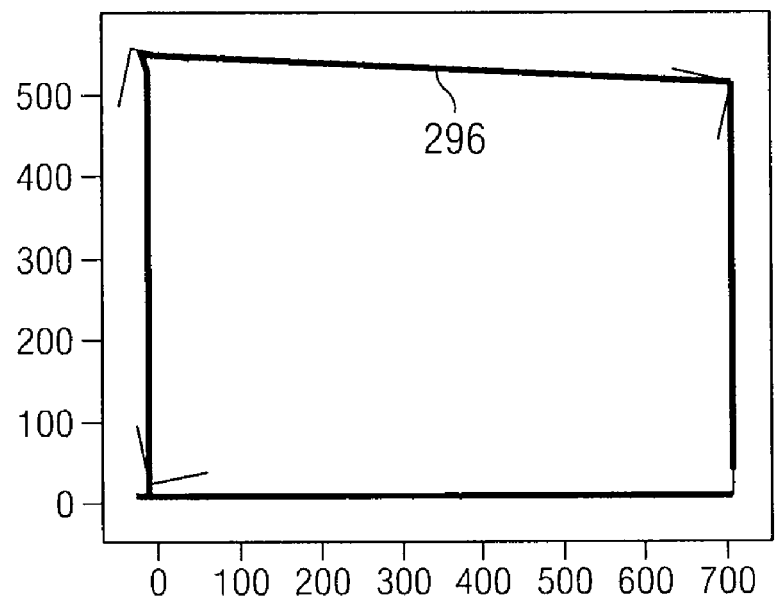

FIG. 8E illustrates candidate edge 296. Vectors $V_4$ and $v_5$ have the smallest score of 1185. Candidate edge 296 connects vectors $V_4$ and $v_5$. Candidate edge 296 does not intersect an existing edge, so candidate edge 296 is confirmed as an edge. Vectors $V_4$ and $v_5$ are designated as a vector pair and removed from further consideration.

Modifications, additions, or omissions may be made to the methods described herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   receiving sensor data generated in response to sensing one or more structures, the sensor data describing a plurality of structural features of the structures;
   identifying the structural features of the sensor data;
   representing each structural feature by one or more vectors to yield a plurality of vectors;
   generating a scoring matrix that describes a plurality of distances among the vectors;
   forming one or more vector pairs from at least some of the vectors according to the distances of the scoring matrix; and
   generating a layout of the one or more structures from the vector pairs.

2. The method of claim 1, the identifying the structural features of the sensor data further comprising:
   selecting a plurality of candidate structural features of the plurality of structural features according to one or more distances among the candidate structural features; and
   clustering the candidate structural features to represent a structural feature.

3. The method of claim 1, the representing each structural feature by one or more vectors further comprising:
   representing an n-hedral as a set of n vectors, n representing the number of sides of the n-hedral.

4. The method of claim 1, the representing each structural feature by one or more vectors further comprising:
   representing a plate as a set of vectors comprising at least one wall opening vector and at least one wall closing vector.

5. The method of claim 1, the representing each structural feature by one or more vectors further comprising:
   calculating an angular distance between vectors of a structural feature; and
   fusing vectors with an angular distance that satisfies an angular distance threshold.

6. The method of claim 1, the representing each structural feature by one or more vectors further comprising:
   determining that a wall opening vector of a first structural feature conflicts with a second structural feature; and
   removing the wall opening vector.

7. The method of claim 1, the forming one or more vector pairs from at least some of the vectors further comprising:
   selecting two vectors with origins that are within a specific distance from each other;
   defining a plane that include the origins;
   determining that the plane does not intersect an existing plane;
   determining that the plane is substantially aligned with the two vectors; and
   designating the two vectors as a vector pair.

8. The method of claim 1, the forming one or more vector pairs from at least some of the vectors further comprising:
   selecting two vectors with origins that are within a specific distance from each other;
   defining a plane that include the origins;
   determining that the plane intersects an existing plane; and
   determining that the two vectors are not a vector pair.

9. A non-transitory computer readable medium storing logic configured to:
   receive sensor data generated in response to sensing one or more structures, the sensor data describing a plurality of structural features of the structures;
   identify the structural features of the sensor data;
   represent each structural feature by one or more vectors to yield a plurality of vectors;

generate a scoring matrix that describes a plurality of distances among the vectors;
form one or more vector pairs from at least some of the vectors according to the distances of the scoring matrix; and
generate a layout of the one or more structures from the vector pairs.

10. The computer readable medium of claim 9, the logic configured to identify the structural features of the sensor data by:
selecting a plurality of candidate structural features of the plurality of structural features according to one or more distances among the candidate structural features; and
clustering the candidate structural features to represent a structural feature.

11. The computer readable medium of claim 9, the logic configured to represent each structural feature by one or more vectors by:
representing an n-hedral as a set of n vectors, n representing the number of sides of the n-hedral.

12. The computer readable medium of claim 9, the logic configured to represent each structural feature by one or more vectors by:
representing a plate as a set of vectors comprising at least one wall opening vector and at least one wall closing vector.

13. The computer readable medium of claim 9, the logic configured to represent each structural feature by one or more vectors by:
calculating an angular distance between vectors of a structural feature; and
fusing vectors with an angular distance that satisfies an angular distance threshold.

14. The computer readable medium of claim 9, the logic configured to represent each structural feature by one or more vectors by:
determining that a wall opening vector of a first structural feature conflicts with a second structural feature; and
removing the wall opening vector.

15. The computer readable medium of claim 9, the logic configured to form one or more vector pairs from at least some of the vectors by:
selecting two vectors with origins that are within a specific distance from each other;
defining a plane that include the origins;
determining that the plane does not intersect an existing plane;
determining that the plane is substantially aligned with the two vectors; and
designating the two vectors as a vector pair.

16. The computer readable medium of claim 9, the logic configured to form one or more vector pairs from at least some of the vectors by:
selecting two vectors with origins that are within a specific distance from each other;
defining a plane that include the origins;
determining that the plane intersects an existing plane; and
determining that the two vectors are not a vector pair.

17. A apparatus comprising:
an interface configured to:
receive sensor data generated in response to sensing one or more structures, the sensor data describing a plurality of structural features of the structures; and
a processor coupled to the interface and configured to:
identify the structural features of the sensor data;
represent each structural feature by one or more vectors to yield a plurality of vectors;
generate a scoring matrix that describes a plurality of distances among the vectors;
form one or more vector pairs from at least some of the vectors according to the distances of the scoring matrix; and
generate a layout of the one or more structures from the vector pairs.

18. The apparatus of claim 17, the processor configured to identify the structural features of the sensor data by:
selecting a plurality of candidate structural features of the plurality of structural features according to one or more distances among the candidate structural features; and
clustering the candidate structural features to represent a structural feature.

19. The apparatus of claim 17, the processor configured to represent each structural feature by one or more vectors by:
representing an n-hedral as a set of n vectors, n representing the number of sides of the n-hedral.

20. The apparatus of claim 17, the processor configured to represent each structural feature by one or more vectors by:
representing a plate as a set of vectors comprising at least one wall opening vector and at least one wall closing vector.

21. The apparatus of claim 17, the processor configured to represent each structural feature by one or more vectors by:
calculating an angular distance between vectors of a structural feature; and
fusing vectors with an angular distance that satisfies an angular distance threshold.

22. The apparatus of claim 17, the processor configured to represent each structural feature by one or more vectors by:
determining that a wall opening vector of a first structural feature conflicts with a second structural feature; and
removing the wall opening vector.

23. The apparatus of claim 17, the processor configured to form one or more vector pairs from at least some of the vectors by:
selecting two vectors with origins that are within a specific distance from each other;
defining a plane that include the origins;
determining that the plane does not intersect an existing plane;
determining that the plane is substantially aligned with the two vectors; and
designating the two vectors as a vector pair.

24. The apparatus of claim 17, the processor configured to form one or more vector pairs from at least some of the vectors by:
selecting two vectors with origins that are within a specific distance from each other;
defining a plane that include the origins;
determining that the plane intersects an existing plane; and
determining that the two vectors are not a vector pair.

\* \* \* \* \*